Patented July 22, 1952

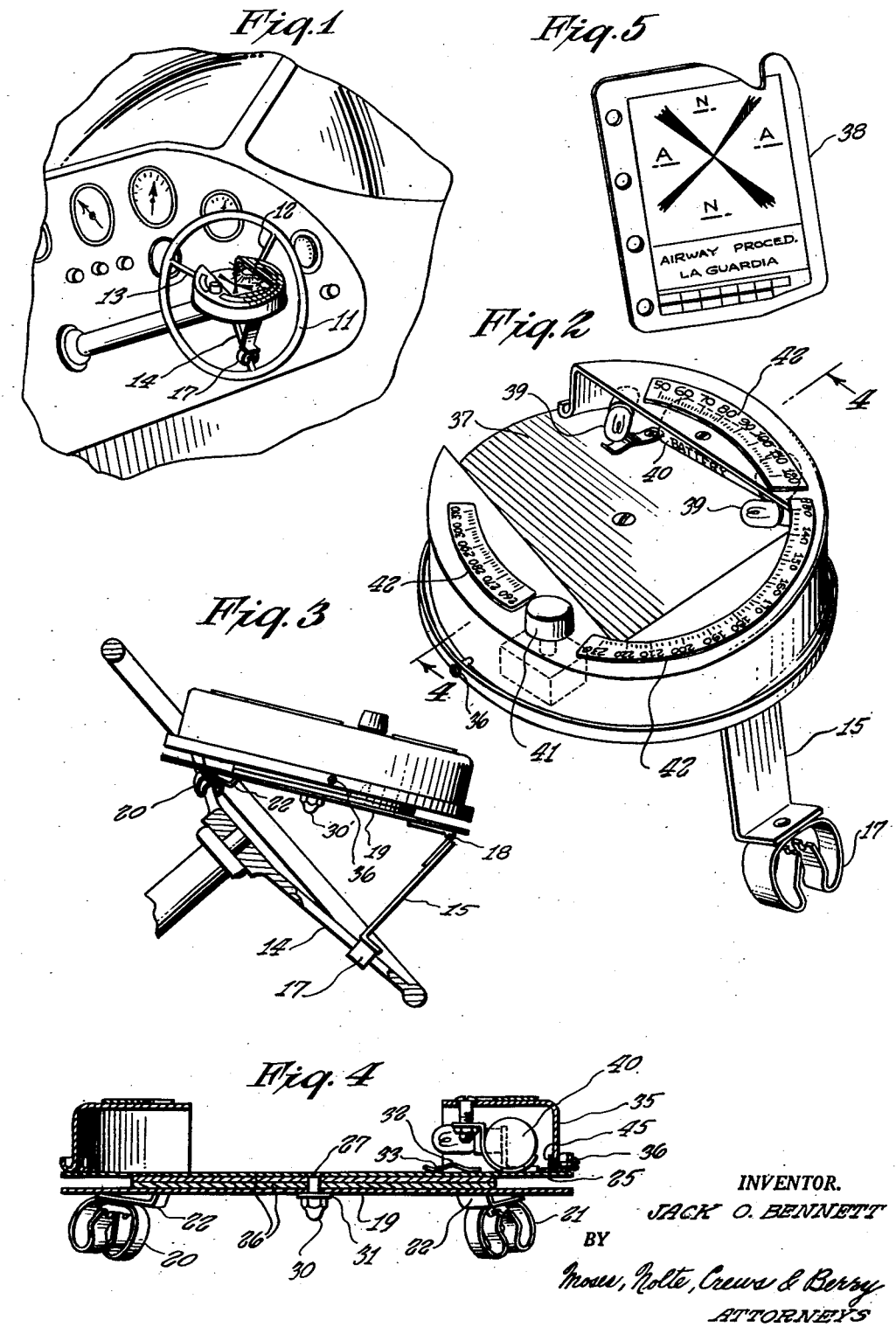

2,603,896

UNITED STATES PATENT OFFICE 2,603,896

CHART HOLDER

Jack O. Bennett, Jackson Heights, N. Y.

Application February 25, 1948, Serial No. 10,603

4 Claims. (Cl. 40—10)

1

The present invention relates to chart holders and more particularly to chart holders suitable for use in the operation of aircraft.

In the operation of modern aircraft, there is a great amount of detailed information that must be constantly kept before the pilot. This information is absolutely essential for proper navigation of the airplane and is much too complex to be committed to memory.

This information is published and distributed in loose leaf binders which are kept up to date on an annual subscription basis. The individual charts may thus be conveniently removed from the binder. Obviously, special charts may be prepared by the pilot himself, but the invention makes this unnecessary where published information is available in standard loose leaf form.

It is an object of the invention to provide a chart holder which is dimensioned to receive the standard published charts. Because all of the available space on the instrument panel is usually taken up by instruments, there is no place left for the chart holder except on the control wheel.

Accordingly, a further object of the invention is to provide a chart holder which may be conveniently and readily attached to the control wheel or removed therefrom.

In furtherance of this object, the invention provides a chart holder of light and compact construction which may be readily carried by the pilot in his bag or brief case when not in use.

Still another object of the invention includes the provision of an azimuth scale by which the chart may be oriented with respect to the longitudinal axis of the airplane.

A further object of the invention is to provide a chart holder which includes facilities for illumination of the chart, the amount of illumination being readily controllable.

At night under conditions of poor visibility, it is essential that the pilot have acute night vision. The cockpit lighting is controllable so that it may be dimmed to a point where it does not interfere with the vision of the pilot. Without the chart holder of the present invention, the pilot in making an instrument landing must hold an instrument landing manual and at the same time he must hold a flashlight which gives a blinding intensity of light under the conditions of reduced illumination. Simultaneously, he must observe the instruments and the ground as he executes the instrument landing. It will be noted that this feature of the invention is of tremendous aid to the pilot in making instrument landings.

It is a feature of the invention that the illumination of the chart is supplied from only one side of the holder, thus preventing the source of light from coming into the field of vision of either adjacent pilot in a two pilot airplane. In this connection, the chart holder is capable of being rotated through 180 degrees so that the source of light will be shielded with respect to the occupant of either of the two pilots' seats.

Other and further objects will become apparent upon reading the following specification together with accompanying drawing forming a part hereof.

Referring to the drawing:

Fig. 1 is a perspective view of an airplane cockpit showing a chart holder embodying the invention positioned on the control wheel;

Fig. 2 is an enlarged perspective view of the chart holder shown in Fig. 1;

Fig. 3 is a side view of the chart holder shown in Fig. 1;

Fig. 4 is a sectional view taken along the line 4—4 of Fig. 2, looking in the direction of the arrows; and Fig. 5 is a plan view of a chart for use with the chart holder.

Referring to Fig. 1, the control wheel 11 of the airplane is shown provided with three spokes 12, 13 and 14, the spoke 14 being normally substantially in a vertical plane and the other two spokes extending outwardly as the arms of a Y. A supporting member 15 carries a spring clip 17 at its lower end, the clip 17 being arranged to snap over the vertical spoke 14 of control wheel 11. Member 15 is attached at its upper end by hinge 18 to platform 19. Two additional spring clips 20 and 21 are secured to platform 19 by leaf springs 22. Spring clips 20 and 21 are thus yieldingly secured to platform 19 and are arranged to clip over spokes 13 and 12 respectively. Clips 17, 20 and 21 are not bound too rigidly permitting limited rotation for alignment with control wheels of different sizes and to different spoke angles. Spring clips have been shown for securing the chart holder to the control wheel. Other forms of readily detachable fastening means may be used if desired, such as screw clamps, for example.

A circular plate 25 is secured to platform 19 by fastening means shown as a screw 27 and nut 30 provided with a lock washer 31. A pair of flat circular spacers 26 serve to maintain plate 25 at a distance from platform 19. These spacers provide smooth action during rotation of plate 25. The lock washer 31 maintains a substantially constant pressure between plate 25, the spacers 26 and platform 19 sufficient to provide a good frictional contact preventing undesired rotation of plate 25 notwithstanding the vibration incidental to operation of the airplane. This frictional force, however, is sufficiently small so that plate 25 may be readily rotated to any desired position.

Secured to the upper surface of plate 25 is a chart securing device shown as a spring 32, generally flat in configuration and provided with a downwardly curved portion 33 stressed by the remainder of the spring to grip a chart securely when the chart is inserted between the curved portion 33 and plate 25. It will be noted that the curved portion 33 also facilitates insertion of the chart in the device.

A cover member 35 is shown conveniently secured to plate 25 by screws 36 which engage brace 45 within the cover member 35. Instead of screws 35, clips or other fastening devices may be used. Cover 35 is generally circular in shape with a portion cut away at 37 to permit quick insertion or removal of the chart. The upper portion of cover 35 is cut away to provide an opening of generally rectangular shape to permit observation of the chart. The device is dimensioned to fit the usual chart such as 38 shown in Fig. 5.

Disposed within the overhanging portion of cover 35 are a pair of miniature incandescent lamps 39 which are energized from a dry cell battery 40 under control of a rheostat 41. The circuit arrangements are conventional in all respects and are therefore not illustrated. The cover 35 may be easily removed for the renewal or replacement of dry cell battery 40 or lamps 39 by the removal of screws 36.

Azimuth markings are inscribed on plates 42 which are secured to the upper surface of cover 35. If desired, these markings may be applied directly to the cover or they may be applied to the device in any other convenient manner. The azimuth markings are so arranged that if the device is turned to have the azimuth reading at the top of the chart holder in agreement with the compass or gyroscope reading of the airplane, the chart will then be oriented with the various directional information shown on the chart in agreement with the charted area as it actually appears before the pilot. This presupposes of course, that the chart was originally inserted in the holder with the north indications on the chart in alignment with the zero of the azimuth graduations of the chart holder.

It will be noted that the chart holder is presented to the pilot at an angle which permits convenient reading of the chart and which places the chart holder somewhat edgewise with respect to the instrument panel of the airplane. This is caused by the action of the supporting member 15 and permits the pilot conveniently to look past the chart holder for observation of the instruments.

I have described what I believe to be the best embodiment of my invention. I do not wish, however, to be confined to the embodiment shown, but what I desire to cover by Letters Patent is set forth in the appended claims.

I claim:

1. A chart holder adapted to be quickly attached to and removed from the steering wheel of an airplane comprising, in combination, a chart supporting plate and three spring clips at the back thereof adapted to be snapped onto the steering wheel spokes, an arm hingedly connected to the back of the plate and carrying one of the clips at the free end thereof, the other two clips being rotatably disposed closely adjacent to the back of the plate, and the construction and arrangement being such that the attitude of the plate relative to the steering wheel can be adjusted by adjusting the arm carried clip along the steering wheel spoke with which it is engaged.

2. A self-contained chart holder adapted for attachment to the steering wheel of an airplane comprising, in combination, a chart supporting table having a snap-on fastening means at the back thereof, a shielding cover attached to and marginally overlying the table to define and conceal a chart surrounding space, said cover being open at one side to permit charts to be slid onto and off of the table in substantially the plane of the table, and a complete chart illuminating means in the chart surrounding space beneath the cover comprising a battery, a light, a switch and circuit wiring.

3. A self-contained holder adapted for attachment to the steering wheel of an airplane comprising, in combination, a chart supporting table having a snap-on fastening means at the back thereof, a shielding cover attached to and marginally overlying the table to define and conceal a chart surrounding space, said cover being open at one side to permit charts to be slid onto and off of the table in substantially the plane of the table, and a complete variable chart illuminating means in the chart surrounding space beneath the shield comprising a battery, a light, a rheostat and circuit wiring.

4. A self-contained holder adapted for attachment to the steering wheel of an airplane comprising, in combination, a chart supporting table having a snap-on fastening means at the back thereof, a shielding cover attached to and marginally overlying the table to define and conceal a chart surrounding space, said cover being open at one side to permit charts to be slid onto and off of the table in substantially the plane of the table, a resilient frictional chart holder disposed to overlie and bear against the table in the chart supporting area thereof, and a complete chart illuminating means in the chart surrounding space beneath the cover comprising a battery, a light, a switch and circuit wiring.

JACK O. BENNETT.

REFERENCES CITED

The following references are of record in the file of this patent:

UNITED STATES PATENTS

| Number | Name | Date |
|---|---|---|
| 1,108,457 | Maull | Aug. 25, 1914 |
| 1,417,319 | Haskel | May 23, 1922 |
| 1,607,752 | Higdon | Nov. 23, 1926 |
| 1,672,806 | Epstein | June 5, 1928 |
| 1,759,544 | Croes | May 20, 1930 |
| 1,813,059 | Lee | July 7, 1931 |
| 2,007,986 | Sprague | July 16, 1935 |
| 2,106,989 | Truesdale | Feb. 1, 1938 |
| 2,118,900 | Schade | May 31, 1938 |
| 2,176,708 | Douglas | Oct. 17, 1939 |
| 2,210,773 | Niemeyer | Aug. 6, 1940 |
| 2,233,280 | Barnes | Feb. 25, 1941 |
| 2,235,177 | Stark | Mar. 18, 1941 |
| 2,303,988 | Christensen | Dec. 1, 1942 |

FOREIGN PATENTS

| Number | Country | Date |
|---|---|---|
| 524,882 | France | May 23, 1921 |